No. 641,908. Patented Jan. 23, 1900.
T. M. TRIPP & P. I. & H. D. JACOBSON.
WRAPPING MACHINE.
(Application filed Jan. 31, 1899.)
(No Model.) 7 Sheets—Sheet 4.
FIG. 6
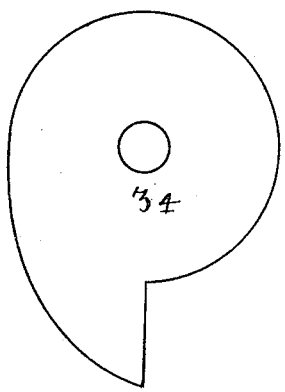
FIG. 9
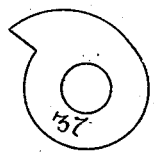

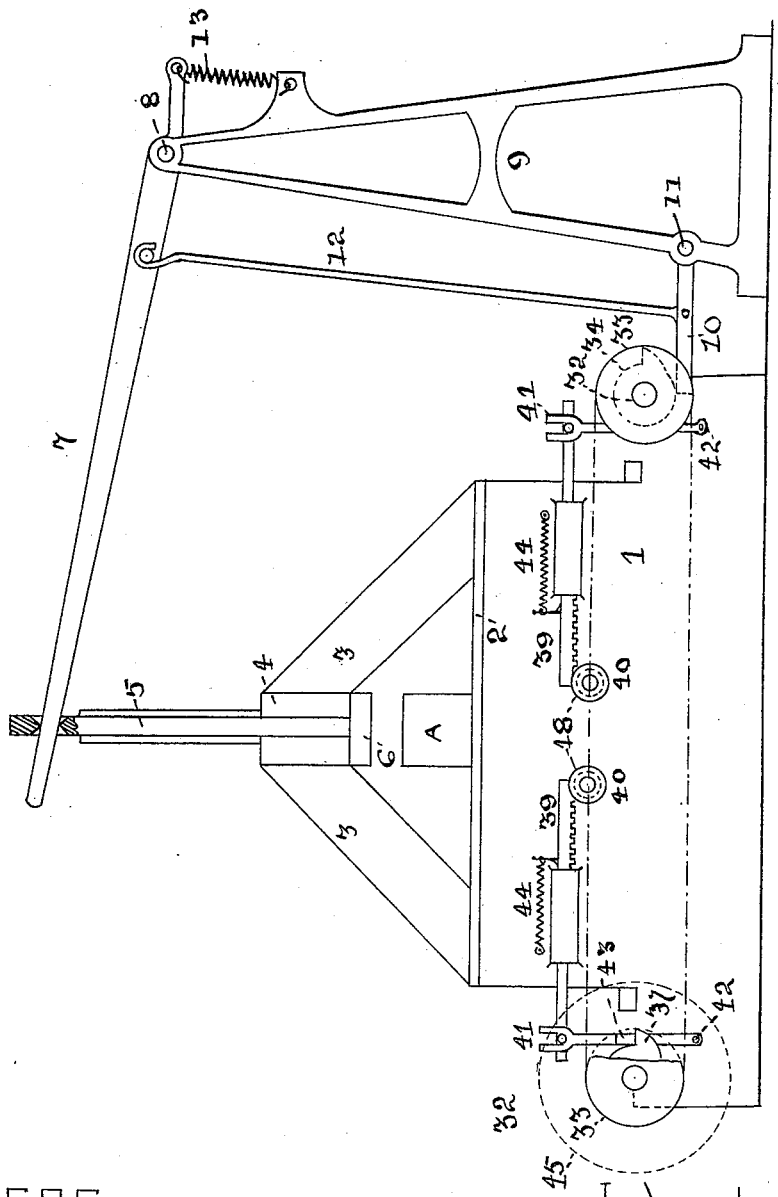

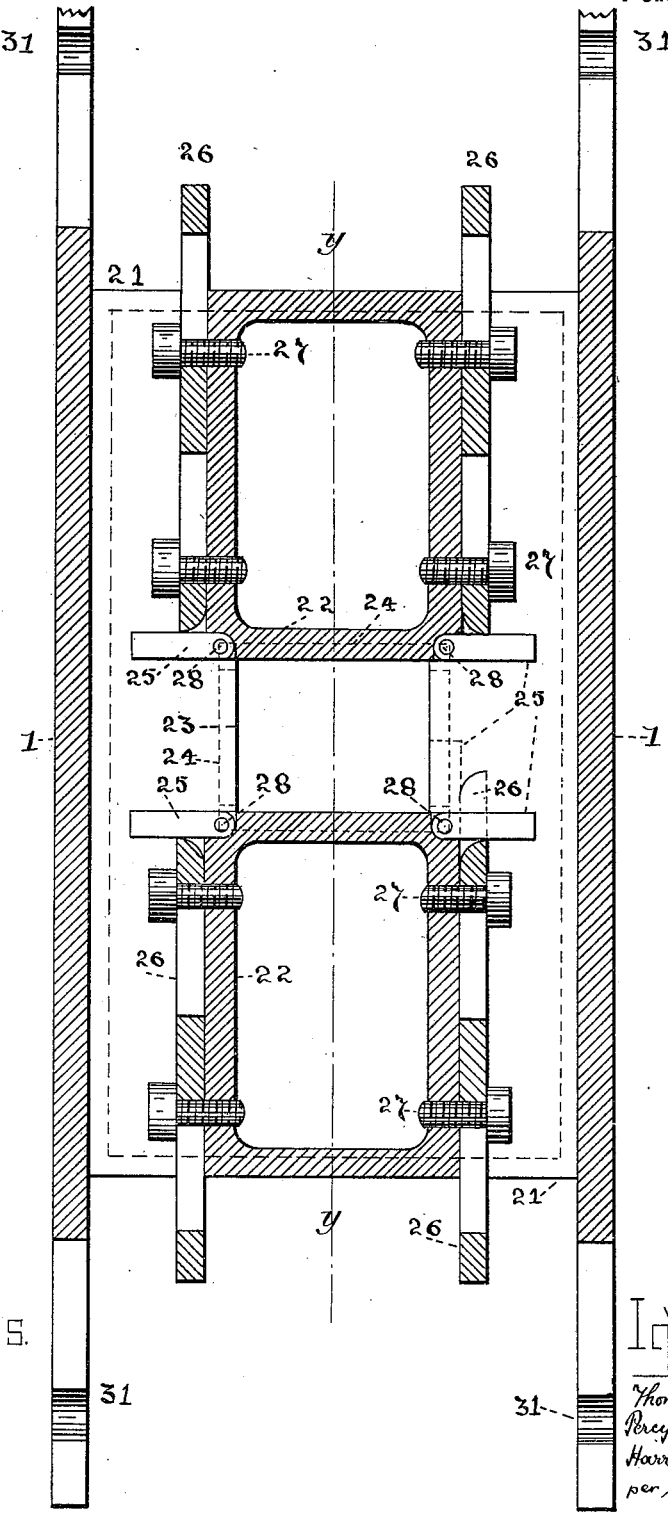

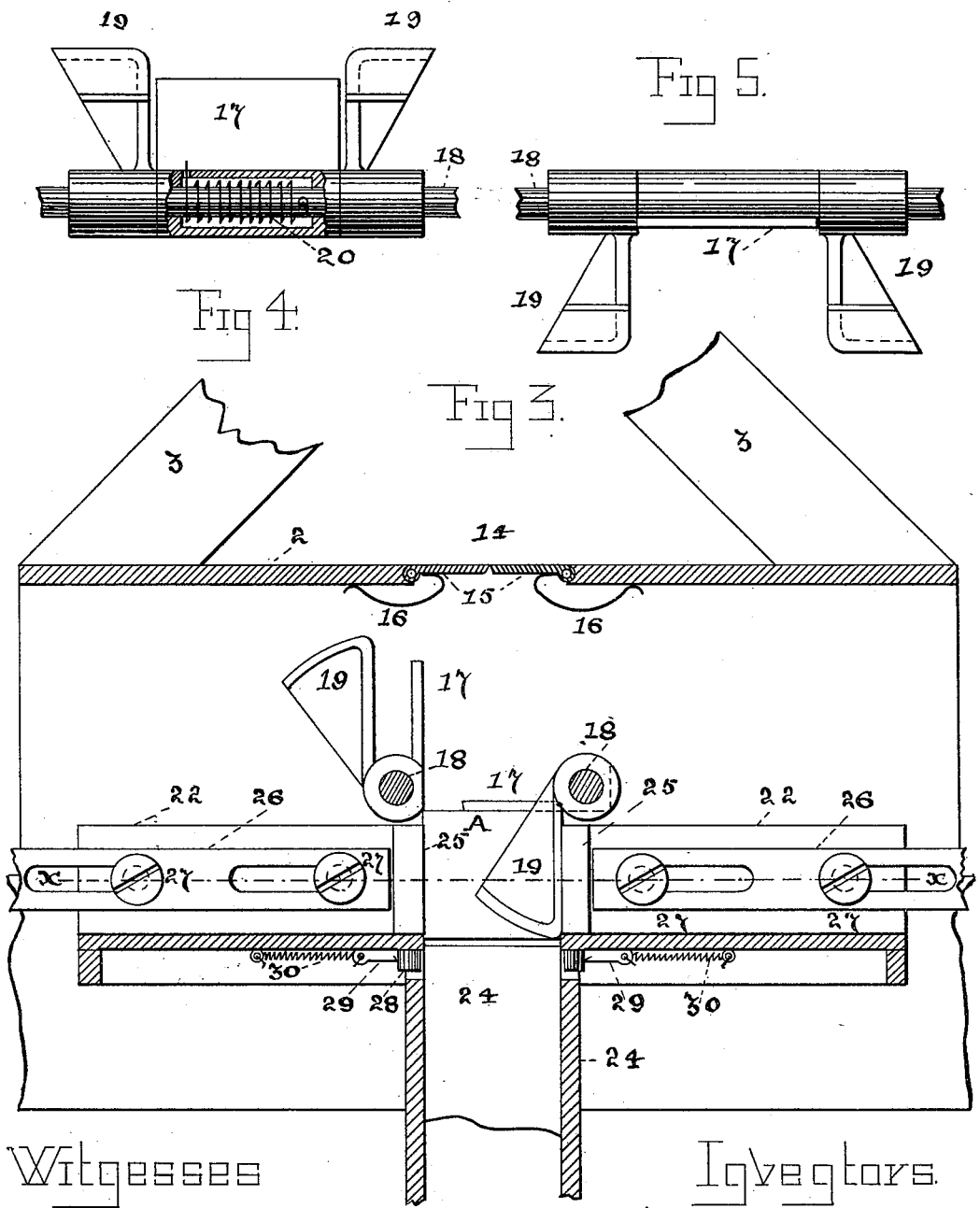

FIG. 10
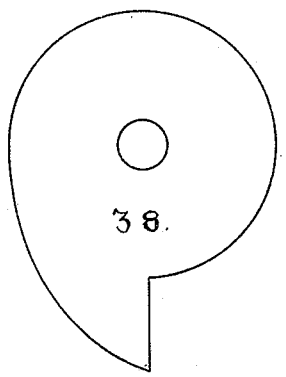
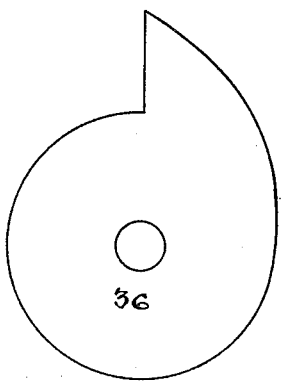
FIG. 8.
Witnesses
Philip Henry Coventry
William Joseph Barber.
Inventors
Thomas Mundy Tripp
Percy Isidore Jacobson
Harry Dobson Jacobson.
per Charles Coventry
Attorney No. 641,908. Patented Jan. 23, 1900.
T. M. TRIPP & P. I. & H. D. JACOBSON.
WRAPPING MACHINE.
(Application filed Jan. 31, 1899.)

(No Model.) 7 Sheets—Sheet 5.

Witnesses
Philip Henry Coventry
William Joseph Barber.

Inventors
Thomas Mundy Tripp
Percy Isidore Jacobson
Harry Dobson Jacobson.
per Charles Coventry.
Attorney No. 641,908. Patented Jan. 23, 1900.
T. M. TRIPP & P. I. & H. D. JACOBSON.
WRAPPING MACHINE.
(Application filed Jan. 31, 1899.)

(No Model.) 7 Sheets—Sheet 6.

Witnesses
Philip Henry Coventry
William Joseph Barber

Inventors
Thomas Mundy Tripp
Percy Isidore Jacobson
Harry Dobson Jacobson
per Charles Coventry
Attorney.

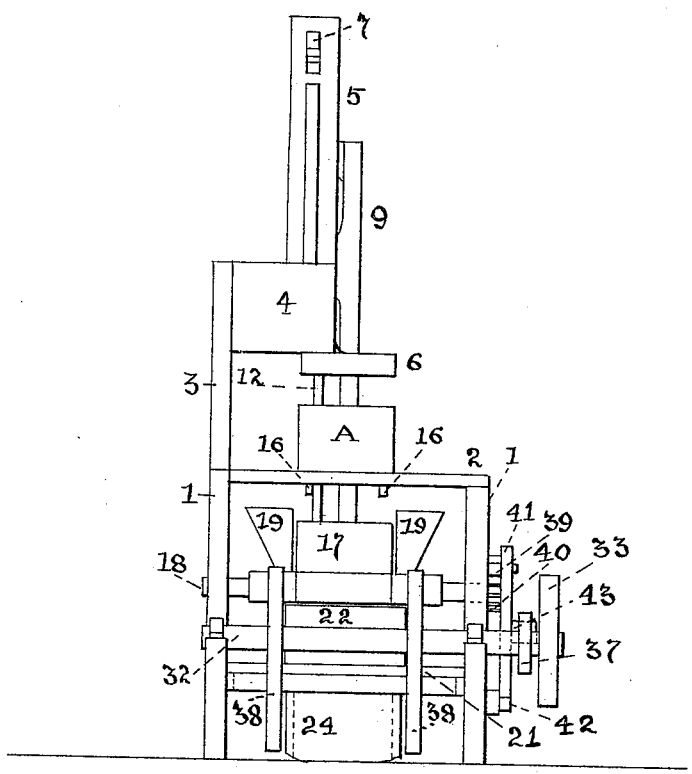

UNITED STATES PATENT OFFICE.

THOMAS MUNDY TRIPP, PERCY ISIDORE JACOBSON, AND HARRY DOBSON JACOBSON, OF LIVERPOOL, ENGLAND.

WRAPPING-MACHINE.

SPECIFICATION forming part of Letters Patent No. 641,908, dated January 23, 1900.

Application filed January 31, 1899. Serial No. 704,037. (No model.)

*To all whom it may concern:*

Be it known that we, THOMAS MUNDY TRIPP, residing at 21 Berkley street, PERCY ISIDORE JACOBSON, residing at 195 Upper Parliament street, and HARRY DOBSON JACOBSON, residing at 13 Hope street, Liverpool, in the county of Lancaster, England, subjects of the Queen of Great Britain, have invented a new and useful Improvement in Parceling-Machines, of which the following is a specification.

Our invention has for its object an improved and simplified machine for parceling. It is specially designed for wrapping caramels in paper, and we will use the term "caramel" for convenience throughout this specification, though other objects—squares of black lead or soap, for instance—may be wrapped. The caramel is placed by hand (or it may be fed by machinery, but this forms no part of our invention) upon a table with the paper beneath it, and a plunger descending upon it carries it downward through a slot therein, and thus turns up the paper at each side. The plunger then withdraws, and immediately thereafter folding devices come into operation and turn the paper over onto the top and downward against the ends. Other folders then continue the end tucks and on withdrawing leave a projecting tongue of paper at each end. The next caramel is then carried down by the plunger, and this causes a still farther descent of the first-named down a chute of approximately the same area as the caramel bottom, thereby completing the folding.

Figure 19:
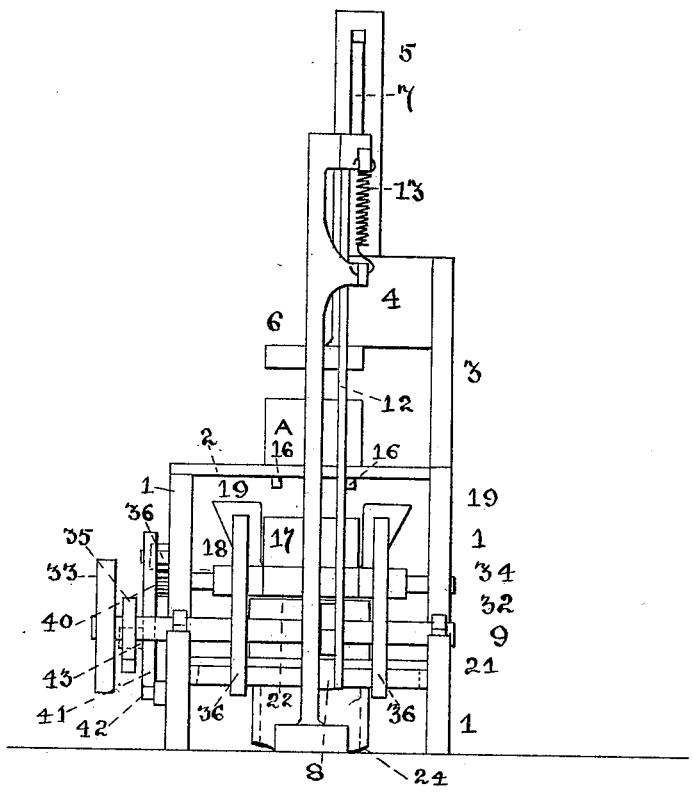

In the drawings, Figure 1 is a side view of our machine. Fig. 2 is a section on the line $x\,x$ of Fig. 3. Fig. 3 is a sectional elevation as on the line $y\,y$ of Fig. 2. Figs. 4 and 5 show details of the wing folders, hereinafter described, in their passive and operative positions, respectively. Fig. 6 is a view of the cam which operates the tripping-lever 10, as hereinafter described. Figs. 7 to 10 are side views of the operating-cams, hereinafter described. Figs. 11 to 18 show the various steps of folding. Figs. 19 and 20 are respectively right and left end views of Fig. 1. Parts are omitted from some of the figures for the sake of clearness. Fig. 1 and Figs. 11 to 20 are drawn to half the scale of the remainder.

1 shows the sides of the frame of the machine, and 2 the table supported thereon.

3 are upwardly-projecting arms carrying guides 4, in which the plunger-rod 5, carrying the plunger 6, reciprocates. The up-and-down motion of the plunger 6 is imparted by an arm 7, pivoted at 8 to a stand 9. A tripping-lever 10, pivoted at 11 to stand 9, is connected by link 12 to arm 7, and when said tripping-lever is depressed (by means of its cam 34, as hereinafter described) plunger 6 is depressed and carries with it the caramel A and on withdrawing leaves it in the position shown in Fig. 3. A spring 13 insures the return of plunger 6 to its topmost position when the tripping-lever 10 is released by its cam.

Figure 7:
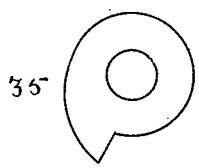
Figure 11:
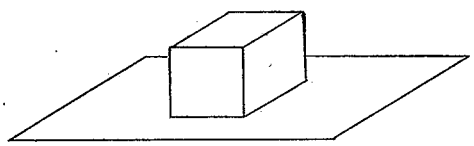
Figure 12:
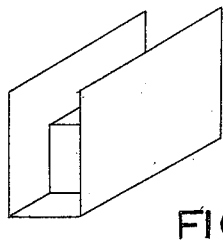

Fig. 11 shows the caramel resting on its paper, and Fig. 12 shows the paper turned up at both sides by the descent through the slot 14 in table 2. A pair of light retractile doors 15 (see Fig. 3) normally close slot 14 and are kept up in place by a pair of light springs 16. The downward course of the caramel is guided on either side by two flaps 17, which form part of what we term the "wing folders." These are clearly shown in Figs. 3, 4, and 5. In Fig. 3 the right-hand flap is shown in a horizontal position resting on the top of the caramel A; but it should be clearly understood that it is not till the plunger has reascended that said flap assumes this horizontal position, as it normally occupies an upright position similar to and opposite the left-hand flap 17.

Each wing folder is mounted on a transverse spindle 18, which is journaled in the side frames 1 of the machine, and comprises a pair of wings 19, rigidly attached to said spindle, and a flap 17 between them free to revolve thereon. The relative positions of said flap and wings are normally maintained by a spiral spring 20, as clearly shown in Fig. 4, and the width of flap 17 is about equal to the length of the caramel A.

Figure 15:
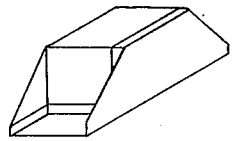

When the caramel arrives at the position shown in Fig. 3 and the plunger 6 has reascended, the right-hand wing folder 17 19 is automatically turned by its spindle, (by means hereinafter described,) and the flap 17 and wings 18 thus turn over the paper flat on the top thereof. (See Fig. 13.) The spindle 18 continuing to rotate leaves the flap 17 resting on the top of the caramel, and the wings 19 sweep down over the ends of the caramel with a circular motion until they arrive at the position shown at the right hand of Fig. 3, and this makes the end tucks at one side of the caramel. (See Fig. 14.) The right-hand wing folder then withdraws to its upright position, and immediately thereafter the left-hand wing folder 17 19 comes into action and fulfils similar functions at the left-hand side. This in turn withdraws and leaves the caramel as seen at Fig. 15. The two side plates are connected together inside by a plate 21, which carries a pair of rectangular guides 22, the adjacent ends of which are placed the width of the caramel apart, and thus form a continuation of the caramel-chute. Plate 21 is slotted, as shown at 23. The final portion of the caramel-chute is formed of rectangular plates 24.

We provide four folders 25, (hereinafter termed "doors,") pivoted in the adjacent corners of guides 22, and their function is to close somewhat after the manner of doors against the ends of the caramel, and thus to complete the end tucks of the paper. Four corresponding fingers 26, attached to guides 22 by set-screws 27, are caused at the proper moment (by means hereinafter described) to push the doors 25, and thus to bring them into the desired position—viz., flat against the ends of the caramel. (See dotted lines, Fig. 2.) These doors are operated in pairs, those at the right hand of the machine we have illustrated being first actuated. The spindle 28 of each door penetrates the plate 21 and carries beneath it an arm 29, to which is attached a spring 30, which constantly tends to keep said doors in their inoperative or open position, as shown in full lines, Figs. 2 and 3. It will thus be seen that on the pressure on fingers 26 being eased doors 25 will at once resume their open position.

Figure 16:
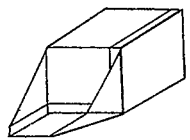
Figure 13:
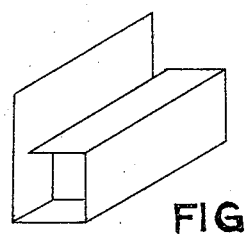
Figure 17:
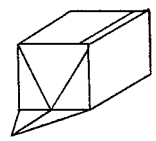
Figure 14:
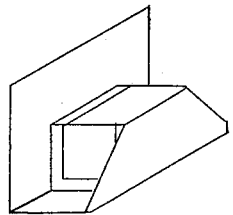
Figure 18:
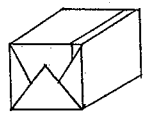

When fingers 26, and consequently doors 25, are actuated at one end of the machine, the paper at one side of the caramel is folded in, as shown at Fig. 16. The other pair of doors next fold the paper at the other side, as shown at Fig. 17. By the time this stage is reached another caramel has been placed upon its paper on the doors 15 of table 2, and the plunger now makes another descent and brings down the second caramel, which takes the place of the previous one and drives the latter down that portion of the chute formed by plates 24. This turns up the projecting tongue of folded paper at each end, and thus completes the folding. (See Fig. 18.) It is to be understood that the caramel being operated upon is supported by those beneath it, the friction against the sides of plates 24 being sufficient to maintain them. That portion of the chute formed by plates 24 may taper a little, if desired.

We will now describe the means for operating the above-described mechanism. Journaled in the side frames 1 at 31, Fig. 2, are two transverse shafts 32, each carrying a toothed wheel 33, and these wheels are positively geared together in any known manner—for instance, by chain-gearing or a train of spur-gearing. The right-hand shaft carries four cams and the left-hand shaft three. These are shown detached, but occupying their proper relative angular positions, in Figs. 6 to 10. Those on the right-hand shaft comprise one cam 34 (shown also in dotted lines in Fig. 1) for depressing the tripping-lever 10, as above described, one cam 35 for operating the wing folders 17 19 on the right-hand side, and two cams 36 for pushing the right-hand fingers 26. The left-hand shaft carries one cam 37 for operating the left-hand wing folder and two cams 38 for pushing the left-hand fingers 26. The cycle of these cams' operations is as follows: Cam 34 depresses and again releases the tripping-lever 10, cam 35 operates the right wing folder, cam 37 operates the left wing folder, cam 36 pushes the right fingers, and cam 38 actuates the left fingers. The wing-folder spindles 18 are rotated at the required point by means of reciprocating racks 39 and pinions 40, the forward motion being imparted to the racks by yoked levers 41, pivoted at 42 to the side frames and carrying striking-plates 43, Figs. 1, 19, and 20, with which the cams engage. Springs 44 serve to return the racks, and consequently the wing folders 17 19, to normal position. The chain-dotted line 45, Fig. 1, indicates the position of a light pulley or spur-wheel to receive power from any suitable source.

We are aware that machines having for their object to wrap caramels have before this date been designed; but we consider that ours possesses advantages over previous machines in that it is very simple of construction and has comparatively few moving parts.

What we do claim as our invention, and desire to secure by Letters Patent, is—

1. The combination of a slotted table adapted to support the caramel and its paper, means for pushing the caramel downward through said slot, a pair of folders mounted on spindles adjacent to the track of the caramel, each folder comprising a central flap loose on its spindle and two wings rigid on said spindle, the latter adapted to make the end tucks in the paper, a spring connecting said flap and wings together in such manner that they constantly tend to maintain their relative positions, and means for completing the folding or parceling, substantially as described.

2. In a parceling-machine the combination of means for pushing the caramel and its paper downward through a slotted table and thus turning the paper up at each side, spindles 18 carrying flaps 17 loose thereon and wings 19 rigid therewith, a spring connecting said flap and wings, pinions mounted on said spindles, racks adapted to turn said pinions, and means to actuate said racks substantially as described and shown.

3. In a parceling-machine the combination of means for pushing the caramel and its paper through a slotted table and thus turning the paper up at each side, and means for folding the paper over the top of the caramel, and effecting the first step in the folding of it over the ends thereof, of a pair of rectangular guides located adjacent to the caramel-chute and having doors 25 pivoted in their adjacent corners, and fingers 26 adapted to close said doors and to lie flat against them when closed, with means for operating said fingers in a right line, substantially as described.

4. The combination of side plates 1, transverse plate 21 supported thereby, guides 22 carried by said plate, fingers 26 supported by said guides, doors 25 adapted to be closed by said fingers, spindles 28 upon which said doors are mounted, arms 29 carried by said spindles, beneath said plate 21, and springs 30 attached to said arms, whereby the return of doors 25 to normal or inoperative position is effected, substantially as described.

THOMAS MUNDY TRIPP.
PERCY ISIDORE JACOBSON.
HARRY DOBSON JACOBSON.

Witnesses:
WM. DIXON,
ELLEN GORDON.